United States Patent
Winger et al.

(10) Patent No.: US 12,034,134 B2
(45) Date of Patent: Jul. 9, 2024

(54) INTEGRATED BATTERY AND BATTERY ELECTRICAL CONTROLLER

(71) Applicant: GM Global Technology Operations LLC, Detroit, MI (US)

(72) Inventors: Lyall Kenneth Winger, Waterloo (CA); Dave Gerard Rich, Sterling Heights, MI (US); James Morrison, Sebringville (CA); Suresh Gopalakrishnan, Troy, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 171 days.

(21) Appl. No.: 17/477,670

(22) Filed: Sep. 17, 2021

(65) Prior Publication Data
US 2023/0093333 A1    Mar. 23, 2023

(51) Int. Cl.
*H01M 10/613* (2014.01)
*B60L 50/64* (2019.01)
*B60L 58/26* (2019.01)
*H01M 50/249* (2021.01)

(52) U.S. Cl.
CPC .......... *H01M 10/613* (2015.04); *B60L 50/64* (2019.02); *B60L 58/26* (2019.02); *H01M 50/249* (2021.01)

(58) Field of Classification Search
CPC ... H01M 10/613; H01M 50/249; B60L 50/64; B60L 58/26
See application file for complete search history.

(56) References Cited

U.S. PATENT DOCUMENTS

| | | | |
|---|---|---|---|
| 2009/0317695 A1* | 12/2009 | Wood | H01M 10/425 429/90 |
| 2017/0288187 A1* | 10/2017 | Maguire | H01M 50/3425 |
| 2018/0316071 A1* | 11/2018 | Newman | H01M 10/613 |
| 2019/0221793 A1* | 7/2019 | Krueger | H01M 50/249 |
| 2019/0221801 A1* | 7/2019 | Ewing | A63H 29/22 |

FOREIGN PATENT DOCUMENTS

| | | |
|---|---|---|
| DE | 10101050 A1 | 7/2001 |
| DE | 10110415 A1 | 9/2001 |

OTHER PUBLICATIONS

German Application No. 10 2022 120 228.3 filed Mar. 23, 2023; German Office Action dated Nov. 7, 2023; 5 pages.

* cited by examiner

*Primary Examiner* — Matthew T Martin
*Assistant Examiner* — Taylor Harrison Krone
(74) *Attorney, Agent, or Firm* — CANTOR COLBURN LLP

(57) ABSTRACT

A battery system for a vehicle includes a battery tray having a base wall, a plurality of side walls, and a cover that collectively define a receiving zone. A vent includes an inlet and an outlet exposed to the battery receiving zone. A battery is supported by the base wall. A battery electronic controller (BEC) is arranged in the receiving zone and directly connected to the battery.

18 Claims, 5 Drawing Sheets

INTEGRATED BATTERY AND BATTERY ELECTRICAL CONTROLLER

INTRODUCTION

The subject disclosure relates to the art of battery systems and, more particularly, to an integrated battery and battery electrical controller for a vehicle.

Most vehicles include batteries that provide power for starting, operating electrical components, powering drive motors, and the like. Often times a battery electrical controller (BEC) is used to control and distribute power from a battery, to one or more components in the vehicle. The BEC orchestrates load control on the battery in order to establish desired performance metrics. Thus, the battery is connected, to the BEC through a first set of cables, and the BEC is coupled to components in the vehicle through another set of cables. The need for multiple cables introduces increased resistances that detract from system performance When operating, the battery and the BEC often require cooling. The battery will often include a heat sink and/or be exposed to an airflow. In some cases, the airflow is ducted to the battery. Similarly, the BEC will often be mounted on a heat sink and be provided with a supply of air in order to remove any built up heat that that may detract from an overall operational efficacy. Given the lack of available space under a hood, it is often times difficult to efficiently provide thermal regulation for both the battery and the BEC. Accordingly, the industry would welcome a system that may eliminate the need for multiple cables and provide for efficient thermal management for a battery and a BEC.

SUMMARY

Disclosed is a battery system for a vehicle including a battery tray having a base wall, a plurality of side walls, and a cover that collectively define a receiving zone. A vent includes an inlet and an outlet exposed to the battery receiving zone. A battery is supported by the base wall. A battery electronic controller (BEC) is arranged in the receiving zone and directly connected to the battery.

In addition to one or more of the features described above or below, or as an alternative, further embodiments could include wherein the BEC is supported on the base wall and the battery is supported on the BEC.

In addition to one or more of the features described above or below, or as an alternative, further embodiments could include wherein the BEC includes a lower surface including one or more vent openings fluidically connected to the outlet.

In addition to one or more of the features described above or below, or as an alternative, further embodiments could include wherein the BEC includes an upper surface including an air outlet fluidically connected to the vent openings and a plurality of raised nodes, the battery resting on the plurality of raised nodes.

In addition to one or more of the features described above or below, or as an alternative, further embodiments could include a cable connection mounted to one of the base wall, the plurality of side walls, and the cover, the cable connection being directly connected to the BEC.

In addition to one or more of the features described above or below, or as an alternative, further embodiments could include wherein the base wall includes a first base wall and a second base wall spaced from the first base wall by the receiving zone.

In addition to one or more of the features described above or below, or as an alternative, further embodiments could include wherein the battery is supported by the second base wall, the battery being directly connected to the BEC through the second base wall.

In addition to one or more of the features described above or below, or as an alternative, further embodiments could include wherein the battery includes an electrical connector that engages with the BEC.

In addition to one or more of the features described above or below, or as an alternative, further embodiments could include a latch system mounted to the second base wall, the latch system securing the battery to the BEC.

In addition to one or more of the features described above or below, or as an alternative, further embodiments could include wherein the battery is one of a lead acid battery, a NiMH battery, and a lithium polymer (LiPO) battery.

Also disclosed is a vehicle including a body defining a passenger compartment, an electrical component, and a battery system operatively connected to the electrical component. The battery system includes a battery tray having a base wall, a plurality of side walls, and a cover that collectively define a receiving zone. A vent includes an inlet and an outlet exposed to the battery receiving zone. A battery is supported by the base wall and a battery electronic controller (BEC) arranged in the receiving zone and directly connected to the battery.

In addition to one or more of the features described above or below, or as an alternative, further embodiments could include wherein the BEC is supported on the base wall and the battery is supported on the BEC.

In addition to one or more of the features described above or below, or as an alternative, further embodiments could include wherein the BEC includes a lower surface including one or more vent openings fluidically connected to the outlet.

In addition to one or more of the features described above or below, or as an alternative, further embodiments could include wherein the base wall includes a first base wall and a second base wall spaced from the first base wall by the receiving zone.

In addition to one or more of the features described above or below, or as an alternative, further embodiments could include wherein the battery is supported by the second base wall, the battery being directly connected to the BEC through the second base wall.

In addition to one or more of the features described above or below, or as an alternative, further embodiments could include a latch system mounted to the second base wall, the latch system securing the battery to the BEC.

Still further disclosed is a method of ventilating a vehicle battery system including directly connecting a battery to a battery electronic control (BEC), supporting the battery and the BEC on a battery tray, introducing an airflow into a duct connected to the battery tray, and passing the airflow over the battery and the BEC.

In addition to one or more of the features described above or below, or as an alternative, further embodiments could include wherein directly connecting the battery to the BEC includes inserting a terminal on the battery into a terminal receiver on the BEC.

In addition to one or more of the features described above or below, or as an alternative, further embodiments could include wherein passing the airflow over the battery and the BEC includes passing the airflow through a gap between the battery and the BEC.

In addition to one or more of the features described above or below, or as an alternative, further embodiments could include wherein passing the airflow over the battery and the BEC includes passing the airflow through the BEC into the gap.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
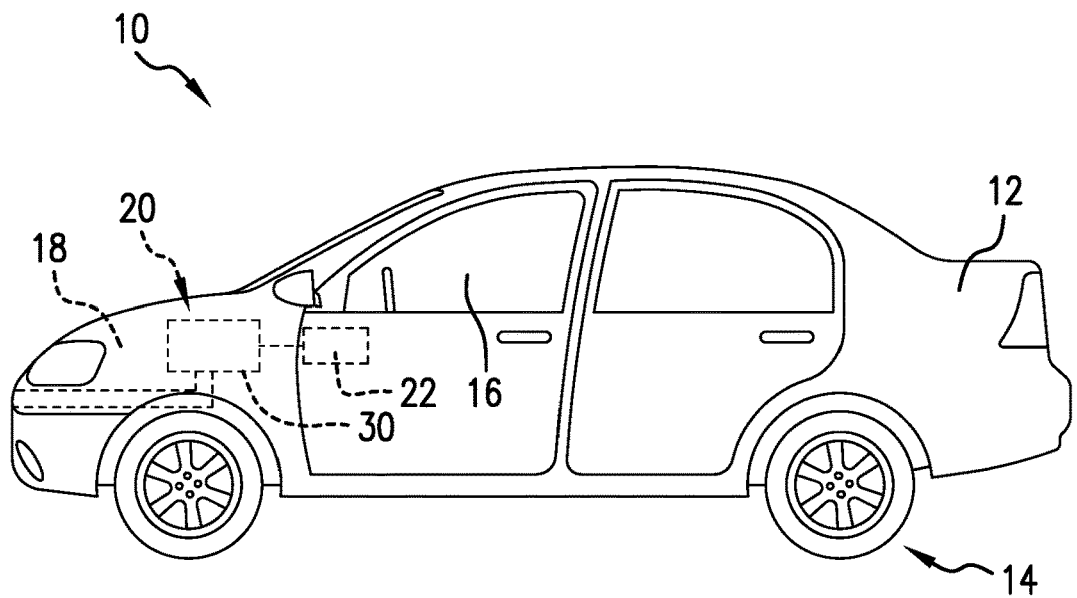
FIG. 1 depicts a vehicle having a battery system including an integrated battery and battery electronic controller (BEC), in accordance with a non-limiting example.
Figure 2:
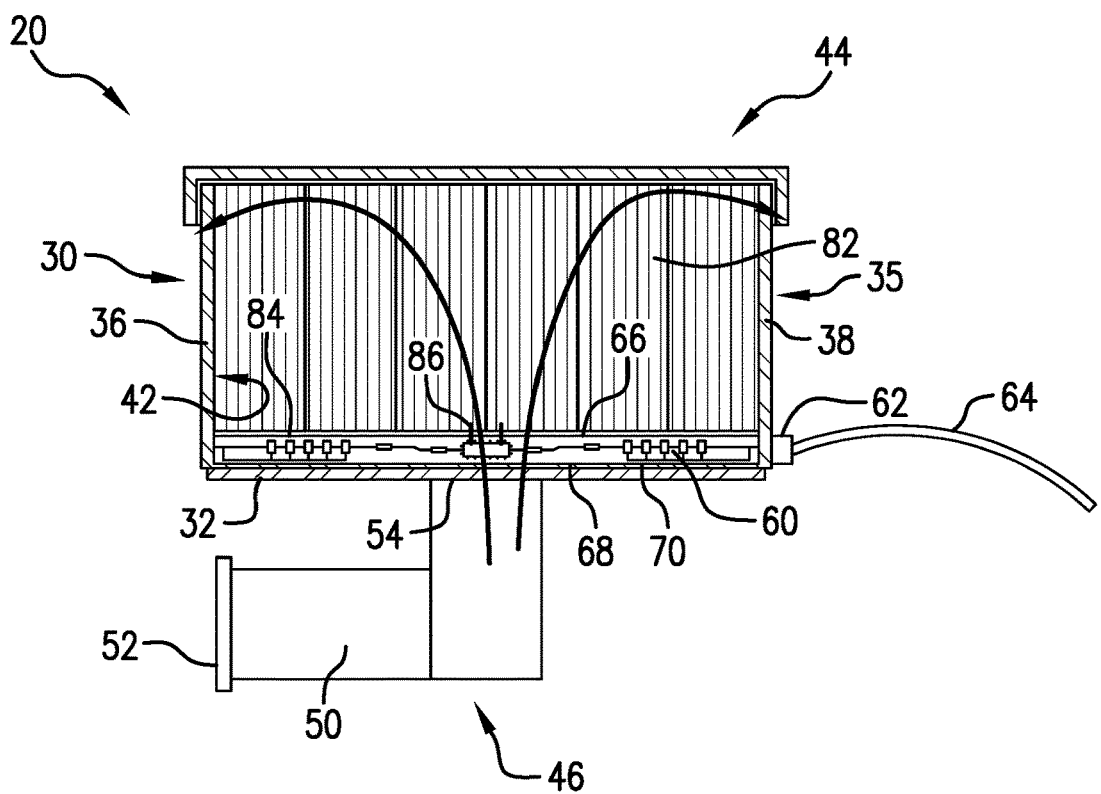
FIG. 2 depicts a partial cross-section side view of the battery system of FIG. 1, in accordance with a non-limiting example.
Figure 3:
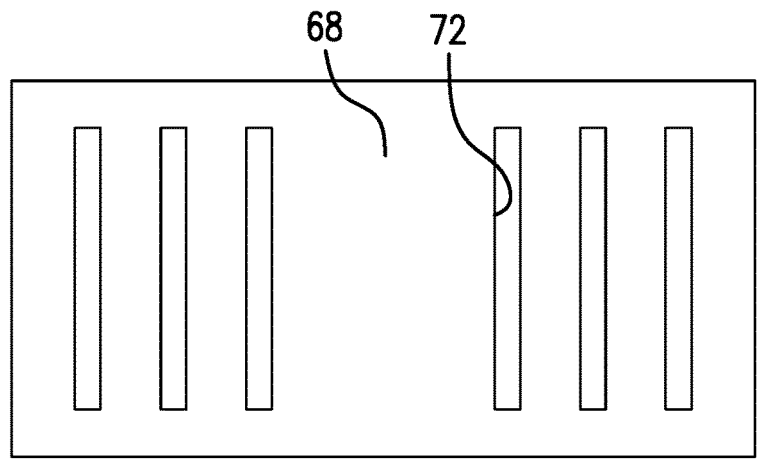
FIG. 3 depicts a bottom view of the BEC, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported by a plurality of wheels, indicated generally at 14. Body 12 includes a passenger compartment 16 and a battery compartment 18. A battery system 20 is arranged in battery compartment 18. Battery system 20 is connected to one or more electrical components 22 in vehicle 10 such as power systems, accessories, starter motors, and/or the like. At this point, it should be understood that while shown as being positioned in a forward portion of vehicle 10, battery compartment 18 may be arranged in a variety of locations including mid-way through vehicle 10 or in a rear portion of vehicle 10.

Reference will now follow to FIGS. 2-5 in describing battery system 20 in accordance with a non-limiting example. Battery system 20 includes a battery tray 30 having a base wall 32 and a plurality of side walls 35. Plurality of side walls 35 includes a first side wall 36 and a second side wall 38 as well as third and fourth side walls (not shown). Base wall 32 and the plurality of side walls 35 define a receiving zone 42 that may receive one or more battery system components as will be detailed herein. A cover 44 may be provided on battery tray 30.

In a non-limiting example, a vent system 46 is connected to battery tray 30. Vent system 46 includes a duct 50 having an inlet 52 and an outlet 54. Inlet 52 may be arranged proximate to, for example, a front grille (not separately labeled) of vehicle 10. Outlet 54 opens into receiving zone 42. In a non-limiting example, a battery electronic controller (BEC) 60 is supported on base wall 32. BEC 60 is electrically coupled to a cable connection 62 provided on second side wall 38. A cable 64 is connected to cable connection 62. Cable 64 provides power to the one or more vehicle components (not shown), such as a starter motor, a hybrid engine, or an electric motor that provides power to one or more of the plurality of wheels 14.

Figure 4:
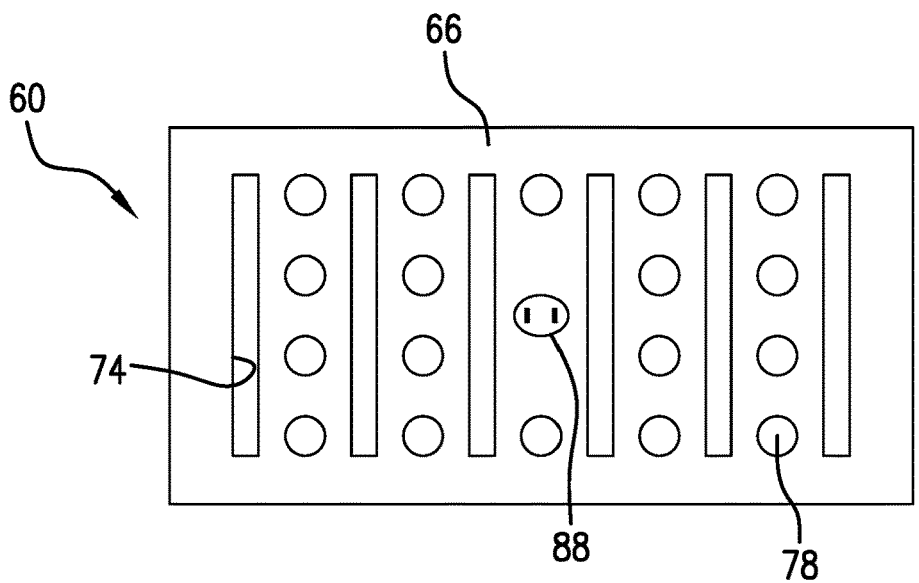
FIG. 4 depicts a top view of the BEC, in accordance with a non-limiting example.
Figure 5:
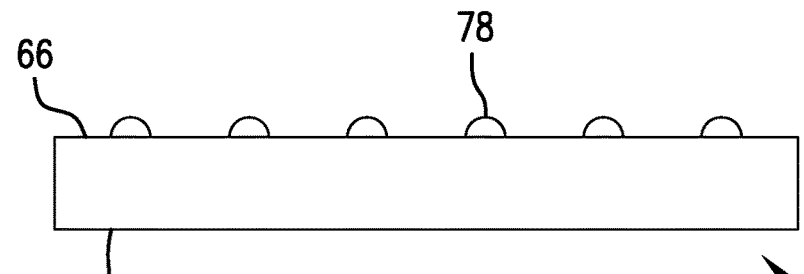
FIG. 5 depicts a side view of the BEC, in accordance with a non-limiting example.

In a non-limiting example, BEC 60 includes an upper surface 66 and a lower surface 68. Lower surface 68 is spaced from base wall 32 by a gap or channel 70 and includes a plurality of vent openings 72 that may receive an airflow passing from outlet 54. The direction and flow paths taken by the airflow may vary. Upper surface 66 includes a plurality of air outlets 74 as shown in FIG. 4. In a non-limiting example, upper surface 66 may also include a plurality of raised nodes 78 as shown in FIG. 5.

A battery 82 is arranged in receiving zone 42 and supported on upper surface 66 of BEC 60 by the plurality of raised nodes 78. In this manner, a gap or channel 84 is defined between upper surface 66 and battery 82. In a non-limiting example, battery 82 includes an electrical connector 86 that plugs directly into a connector receiver 88 in BEC 60. Battery 82 may take the form of a lithium polymer (LiPo) battery. Of course, it should be understood that battery 82 may possess one of a variety of battery chemistries including lead-acid, nickel-metal hydride (NiMH), and the like.

In a non-limiting example, vent system 46 provides an airflow that passes into BEC 60 via channel 70, flows into channel 84 and flows around battery 82 in a heat exchange relationship. By integrating BEC 60 and battery 82, a single vent system may provide a desired airflow that reduces operating temperatures of both battery system components (e.g., battery 82 and BEC 60). Further, by providing battery 82 with an ability to plug directly into BEC 60 users may readily purchase and replace a battery without the need for assistance.

Figure 6:
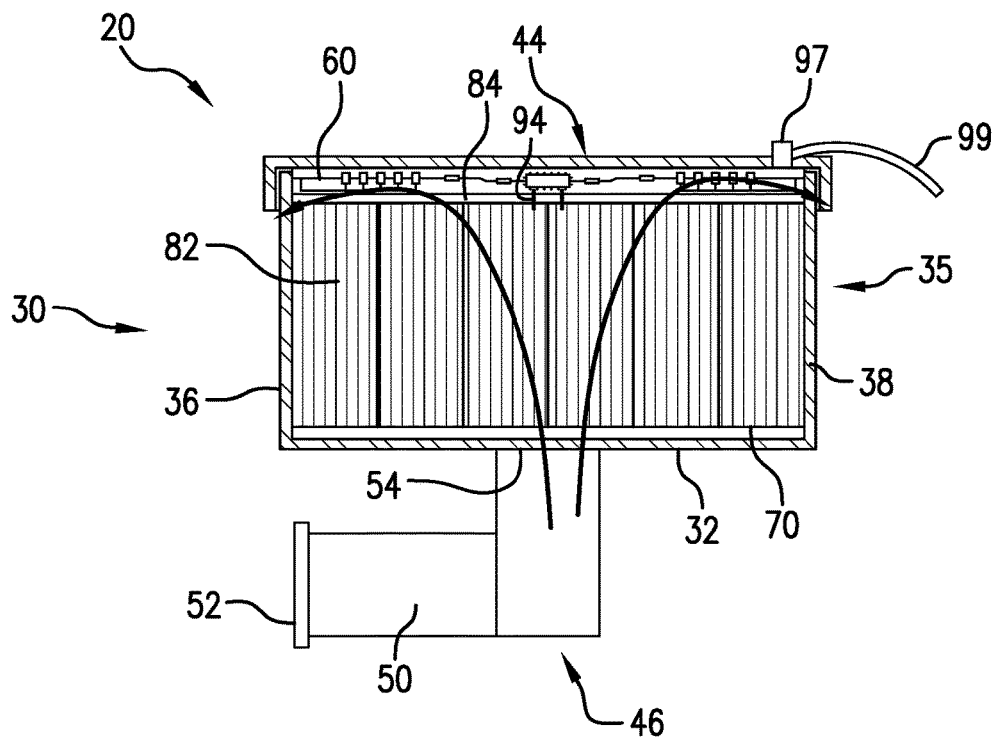
FIG. 6 depicts a partial cross-section side view of the battery system of FIG. 1, in accordance with another non-limiting example.

Reference will now follow to FIG. 6 in describing battery system 20 in accordance with another non-limiting example. BEC 60 is mounted on top of battery 82. BEC 60 is directly connected to battery 82 through an electrical connection 94 that projects outward from battery 82. BEC 60 is coupled to a cable connector 97 provided on cover 44. Cable connector 97 is electrically coupled to a cable 99 that provides power from battery 82, via BEC 60 to other vehicle components (not shown).

Reference will now follow to FIGS. 7-11 in describing a battery system 112 in accordance with another non-limiting example. Battery system 112 includes a battery tray 118 including a first base wall 120, a second base wall 122 and a plurality of side walls 124 extending between and connecting first base wall 120 with second base wall 122. Plurality of side walls 124 includes a first side wall 127, a second side wall 128, a third side wall 129 (FIG. 9) and a fourth side wall 130. First base wall 120, second base wall 122 and the plurality of side walls 124 define a receiving zone 132.

A BEC 135 is arranged in receiving zone 132 and supported on first base wall 120. A battery 138 includes a base 140 that is supported on second base wall 122. Battery 138 may take the form of a LiPo battery. However, as indicated herein, battery 138 may possess various battery chemistries. A gap or channel 142 is defined between base 140 and second base wall 122 and another gap or channel 144 is defined between BEC 135 and first base wall 120. An opening 146 is defined in second base wall 122. Opening 146 fluidically connects receiving zone 132 with channel 142. Opening 146 allows air flowing through vent system 46 flowing into and around BEC 135 to pass into channel 142 to cool battery 138. Opening 146 also provides a pathway that allows an electrical connector 150 on battery 138 to plug directly into BEC 135.

Figure 7:
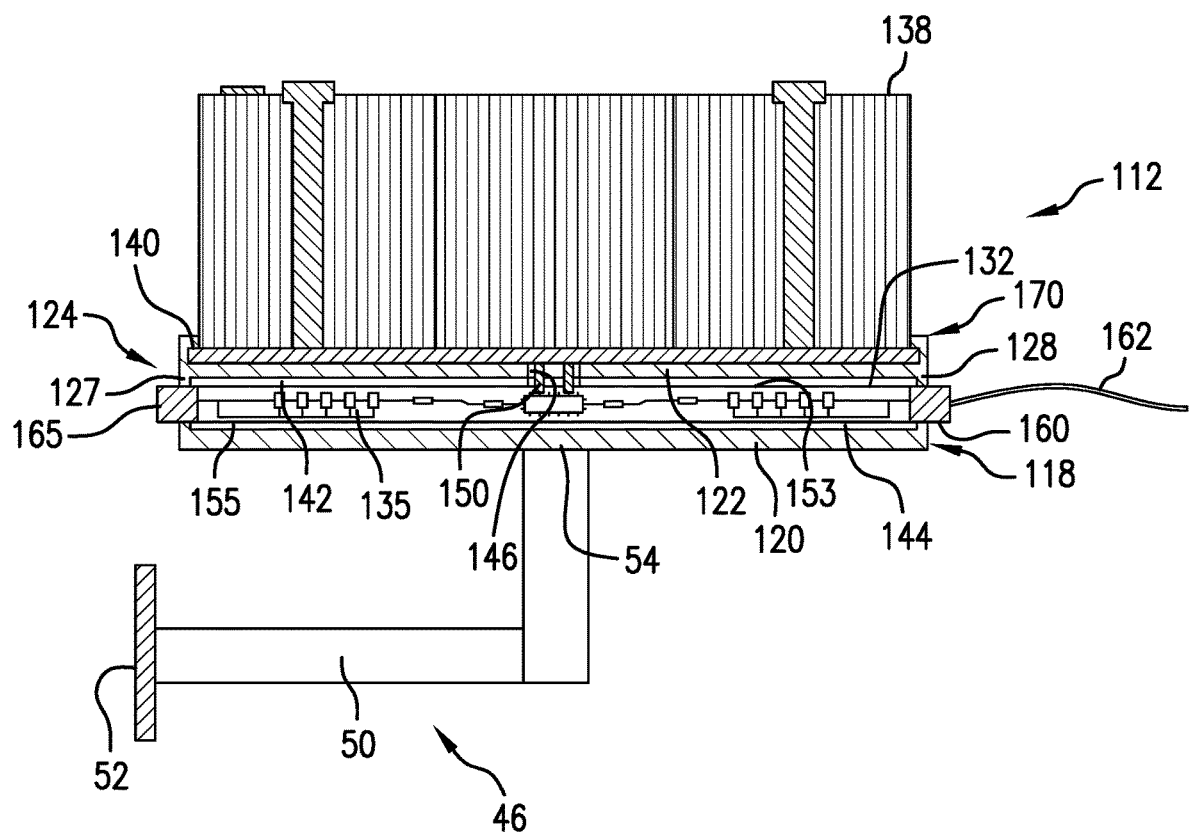
FIG. 7 depicts a partial cross-section side view of the battery system of FIG. 1, in accordance with yet another non-limiting example.
Figure 8:
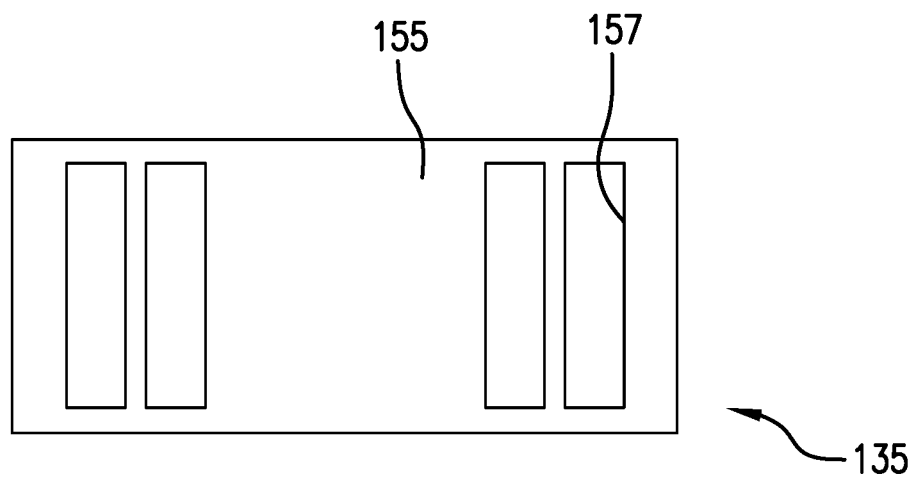
FIG. 8 depicts a bottom view of the BEC of the battery system of FIG. 7, in accordance with a non-limiting example.
Figure 9:
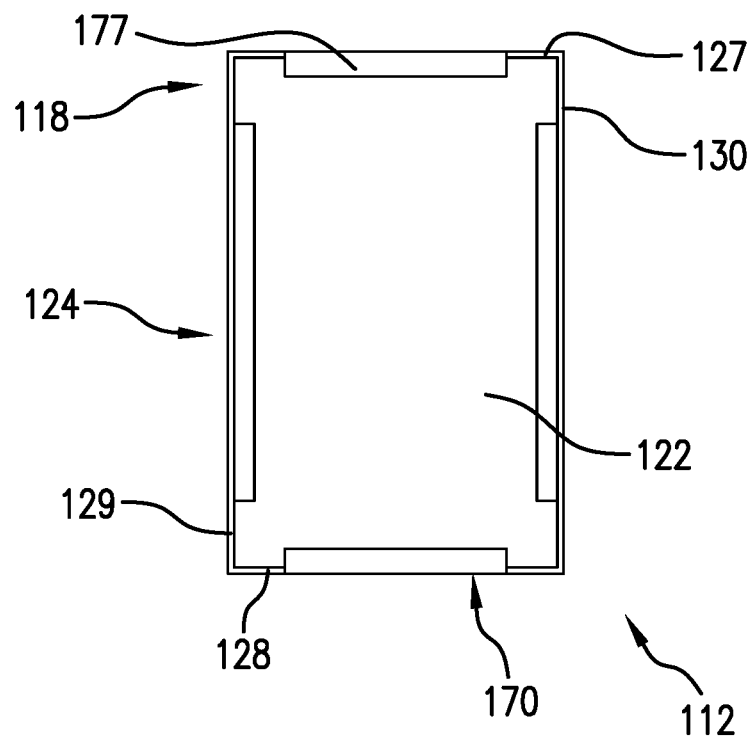
FIG. 9 depicts a top view of the battery system of FIG. 7, in accordance with a non-limiting example.

In a non-limiting example depicted in FIGS. 7 and 8, BEC 135 includes an upper surface 153 and a lower surface 155 including vent openings 157 that fluidically connect with air outlets (not shown) on upper surface 153. With this arrangement, not only may air flow around, but also through BEC 135 to enhance heat exchange and lower operating temperatures to improve operational efficacy. In further accordance with the non-limiting example depicted in FIG. 7, a cable connector 160 is mounted to second side wall 128 and operatively connected to BEC 135. Cable connector 160 supports a cable 162 that provides power to one or more vehicle components (not shown) from battery 138 via BEC 135. Battery system 112 may also include an external charging and/or jump starting port 165 that may be mounted to first side wall 127.

Figure 10:
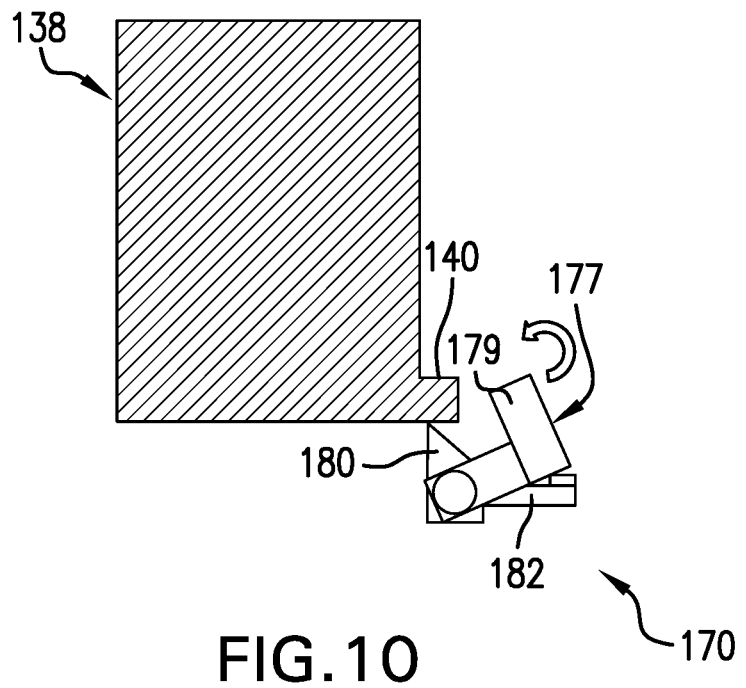
FIG. 10 depicts a latching system of the battery system of FIG. 7 in an open, unlatched state, in accordance with a non-limiting example.
Figure 11:
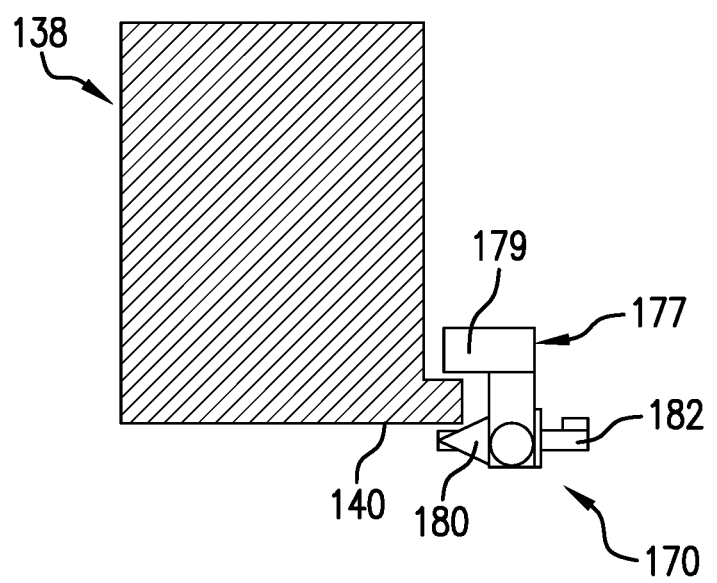
FIG. 11 depicts the latching system of FIG. 10 in a latched state, in accordance with a non-limiting example.

In a non-limiting example depicted in FIGS. 10 and 11 with continued reference to FIG. 7, battery system 112 also includes a latch system 170 that releasably retains battery 138 to second base wall 122. Latch system 170 includes a plurality of latch elements such as shown at 177 on first side wall 127. Latch system 170 may include a latch element on each of the plurality of side walls 124. Each latch element 177 includes a base engaging portion 179 and a latch engaging portion 180. Base engaging portion 179 clamps onto base 140 of battery 138. Latch engaging portion 180 connects with a latch stop 182 that maintains latch element 177 in a latched state (FIG. 11) and prevents over rotation of latch element 177 in an open state (FIG. 10).

At this point, it should be understood that the non-limiting examples discussed herein describe an integrated battery system that not only allows a single vent to cool both a battery and a BEC but also eliminates the need for cables connecting the battery and the BEC while, at the same time, making maintenance easier for operators. That is, an operator may readily replace the battery and/or the BEC without the need for professional intervention. It should also be understood that while shown as being positioned below or atop the batter, the BEC may also be arranged along a side wall of the battery tray or in a battery tray cover. Also, while shown, in accordance with one non-limiting example with the inlet of the vent exposed to ambient to direct a cooling airflow into the batter tray, in other non-limiting example, the inlet may exist in the engine compartment so as to deliver a warming airflow into the battery tray.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A battery system for a vehicle comprising:
a battery tray including a base wall, a plurality of side walls, and a cover that collectively define a receiving zone;
a battery supported by the base wall;
a battery electronic controller (BEC) arranged in the receiving zone and directly connected to the battery, the BEC including an upper surface, a lower surface, and a channel defined between the upper surface and the lower surface, the channel being fluidically exposed to the receiving zone; and
a vent including an inlet and an outlet exposed to the receiving zone and the channel, the vent directing fluid through the receiving zone to cool the battery and through the channel to cool the BEC, wherein the BEC is supported on the base wall and the battery is supported on the BEC.

2. The battery system according to claim 1, wherein the BEC includes a lower surface including one or more vent openings fluidically connected to the outlet.

3. The battery system according to claim 2, wherein the BEC includes an upper surface including an air outlet fluidically connected to the vent openings and a plurality of raised nodes, the battery resting on the plurality of raised nodes.

4. The battery system according to claim 1, further comprising a cable connection mounted to one of the base wall, the plurality of side walls, and the cover, the cable connection being directly connected to the BEC.

5. The battery system according to claim 1, wherein the base wall includes a first base wall and a second base wall spaced from the first base wall by the receiving zone.

6. The battery system according to claim 5, wherein the battery is supported by the second base wall, the battery being directly connected to the BEC through the second base wall.

7. The battery system according to claim 6, wherein the battery includes an electrical connector that engages with the BEC.

8. The battery system according to claim 5, further comprising a latch system mounted to the second base wall, the latch system securing the battery to the BEC.

9. The battery system according to claim 1, wherein the battery is one of a lead acid battery, a NiMH battery, and a lithium polymer (LiPO) battery.

10. A vehicle comprising:
a body defining a passenger compartment;
an electrical component;
a battery system operatively connected to the electrical component, the battery system comprising:
a battery tray including a base wall, a plurality of side walls, and a cover that collectively define a receiving zone;
a battery supported by the base wall;
a battery electronic controller (BEC) arranged in the receiving zone and directly connected to the battery, the BEC including an upper surface, a lower surface, and a channel defined between the upper surface and the lower surface, the channel being fluidically exposed to the receiving zone; and a vent including an inlet and an outlet exposed to the receiving zone and the channel, the vent directing fluid through the receiving zone to cool the battery and through the channel to cool the BEC, wherein the BEC is supported on the base wall and the battery is supported on the BEC.

11. The vehicle according to claim 10, wherein the BEC includes a lower surface including one or more vent openings fluidically connected to the outlet.

12. The vehicle according to claim 10, wherein the base wall includes a first base wall and a second base wall spaced from the first base wall by the receiving zone.

13. The vehicle according to claim 12, wherein the battery is supported by the second base wall, the battery being directly connected to the BEC through the second base wall.

14. The vehicle according to claim 12, further comprising a latch system mounted to the second base wall, the latch system securing the battery to the BEC.

15. The vehicle according to claim 11, wherein the BEC includes an upper surface including an air outlet fluidically connected to the vent openings and a plurality of raised nodes, the battery resting on the plurality of raised nodes.

16. The vehicle according to claim 10, further comprising a cable connection mounted to one of the base wall, the plurality of side walls, and the cover, the cable connection being directly connected to the BEC.

17. The battery system according to claim 6, wherein the battery includes an electrical connector that engages with the BEC.

18. The battery system according to claim 1, wherein the battery is one of a lead acid battery, a NiMH battery, and a lithium polymer (LiPO) battery.

* * * * *